H. MALSBERGER.
COTTON SEED GRADER.
APPLICATION FILED NOV. 13, 1916.

1,264,200.

Patented Apr. 30, 1918.
2 SHEETS—SHEET 1.

Witness
G. T. Baker
E. L. Greenwald

Inventor
Harry Malsberger
By Foster Freeman Watson Hurt
Attorney

H. MALSBERGER.
COTTON SEED GRADER.
APPLICATION FILED NOV. 13, 1916.
1,264,200.
Patented Apr. 30, 1918.
2 SHEETS—SHEET 2.
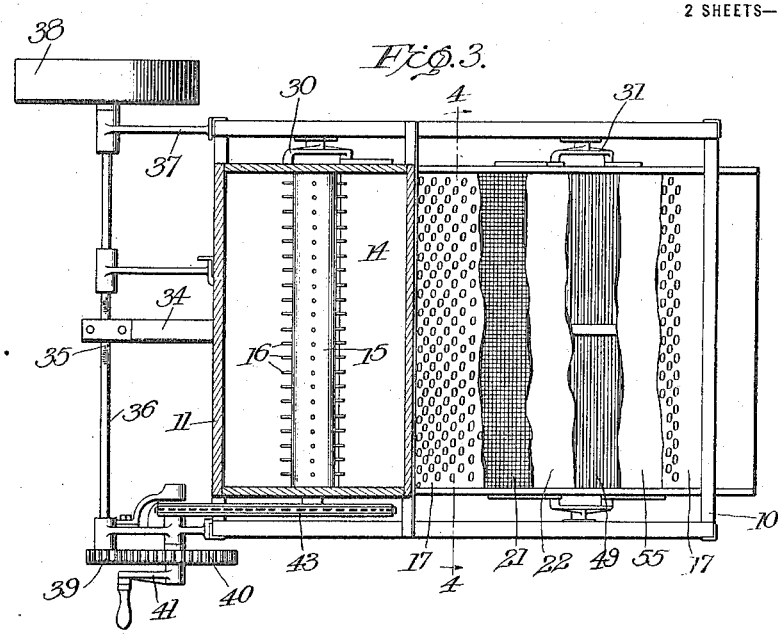
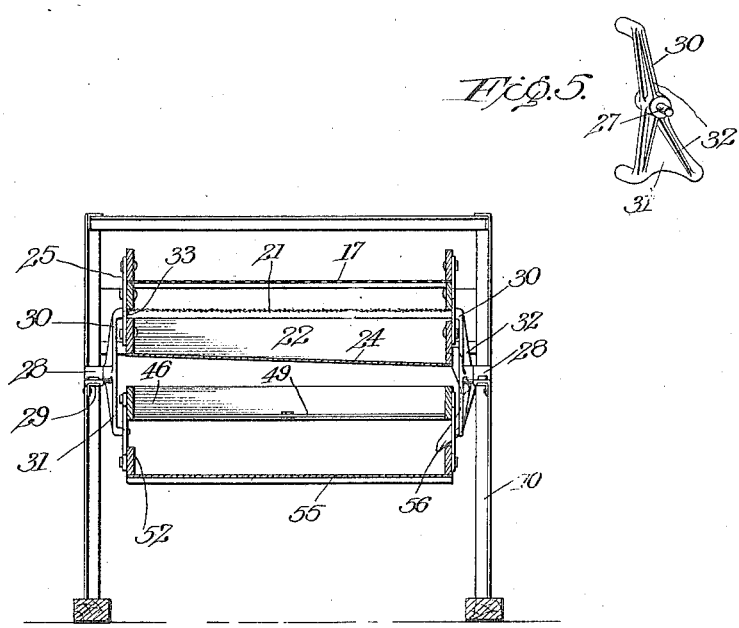
Witness
G. F. Baker
E. L. Greenewald
Inventor
Harry Malsberger
By Foster Freeman Watson & Coit
Attorney

UNITED STATES PATENT OFFICE.

HARRY MALSBERGER, OF YORK, PENNSYLVANIA, ASSIGNOR TO HENRY C. NILES, OF SPRING GARDEN TOWNSHIP, YORK COUNTY, PENNSYLVANIA.

COTTON-SEED GRADER.

1,264,200.

Specification of Letters Patent.

Patented Apr. 30, 1918.

Application filed November 13, 1916. Serial No. 131,094.

*To all whom it may concern:*

Be it known that I, HARRY MALSBERGER, a citizen of the United States, and resident of York, county of York, State of Pennsylvania, have invented certain new and useful Improvements in Cotton-Seed Graders, of which the following is a specification.

This invention relates to cotton seed graders and has particular reference to an inexpensive and simple machine which will separate the trash, dirt, and other foreign matter from cotton seed. Another object is to separate the large cotton seed which still has lint adhering thereto from the small and smooth seed.

The objects and novel features of the invention will be apparent from the following description taken in connection with the drawing, in which:—

Fig. 3 is a top plan view of the machine with parts thereof broken out to disclose the construction of the several screens and other parts;

Fig. 4 is a transverse sectional view of the machine taken on the line 4—4 of Fig. 3 and looking in the direction of the arrows;

Fig. 5 is a perspective view of one of the rockers which support the screening mechanism.

Figure 1:
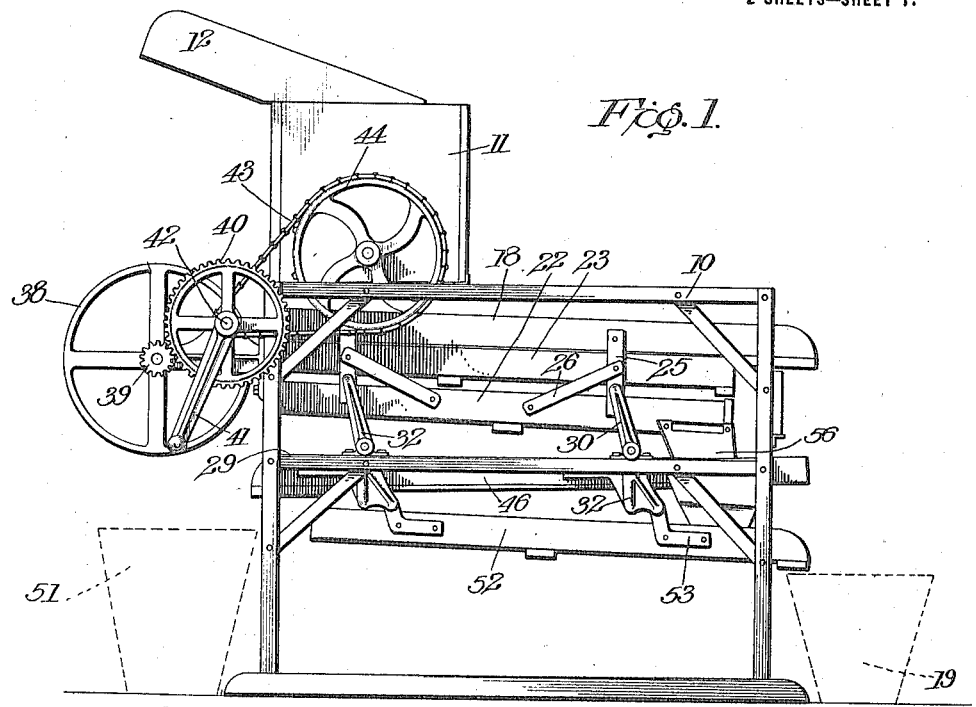
Figure 1 is a side view of a cotton seed grader embodying the invention.
Figure 2:
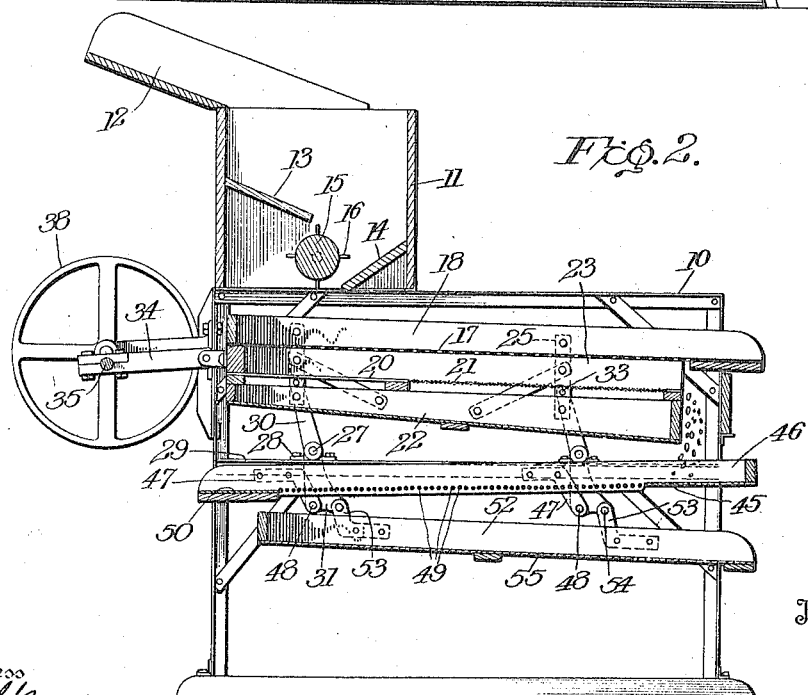
Fig. 2 is a central longitudinal sectional view of the same.

The frame 10 of the grader is built up of suitable base members, standards, cross members and braces as illustrated to form an openwork structure for supporting the separating mechanism to permit easy access thereto. A hopper 11 is mounted on top of the frame 10 and is provided with a feed chute 12 at the top and with oppositely inclined and spaced boards 13 and 14 on the inside. A feed roller 15 is mounted in the space between the ends of the boards 13 and 14 and has rows of pins 16 on its periphery which feed the mixture of cotton seed and foreign matter through the spaces between the boards 13 and 14 and onto the upper end of an inclined screen 17.

The screen 17 consists of a sheet iron plate having oblong perforations therein and constitutes the bottom of a box 18. Practically all of the seed, with considerable dirt and similar foreign matter goes through the perforations in the screen 17 but the trash, sticks and similar material pass down the screen and tails off of the end of it into a receptacle 19 shown in dotted lines or some other suitable device to receive this material. An imperforate plate 20 of sheet iron is placed below that part of the upper screen 17 which is disposed directly beneath the outlet of the feed hopper 11. A second screen 21 of square mesh galvanized wire is located substantially on a level with the plate 20 and allows dirt and dust to pass therethrough into a box 22 below it and practically clean seed discharges as tailings off of the lower end of the screen 21. A box 23 incloses the plate 20 and screen 21 on all sides except the lower end. The box 22 which receives the dirt and other foreign matter has a floor 24 which is inclined downwardly and also toward an opening in one of the lower corners of the box so that the foreign matter will gradually pass out of the box 22 when the machine is in operation. The boxes 18, 23 and 22 are secured together on opposite sides by pairs of plates 25 and pairs of braces 26 so that these parts will move together as a unitary structure when the machine operates.

The unitary structure consisting of the boxes 18, 23 and 22 is supported on a plurality of rockers, one of which is shown in perspective in Fig. 5. These rockers are mounted in pairs on opposite sides of the machine. Each rocker has a stub shaft 27 by means of which the rocker may be pivoted in a bearing 28 carried on a cross member 29 secured to the side of the frame 10. Each rocker has an arm 30 which extends above its pivot 27 and an arm 31 which extends below the pivot. The arms 30 and 31 are strengthened by means of ribs 32 which are formed on the outer sides thereof. The upper ends of the arms 30 are pivotally connected at 33 to the connecting plates 25 and the unitary structure consisting of the boxes 18, 23 and 22 is thus rockably mounted. A bar 34 is connected at one end to the box 23 and at its other end it fits a crank 35 on the drive shaft 36. This drive shaft is mounted in brackets 37 secured to one end of the frame 10 and carries a pulley 38 at one end whereby it may be driven by power and at its other end it is connected by gears 39 and 40 to a crank 41 whereby it may be driven by hand. A sprocket on the crank shaft 42 is connected by means of a chain 43 to a sprocket wheel 44 mounted on the outer end of the shaft of the drum 15 so as to rotate this drum and feed material to the machine evenly.

Large and small seeds which constitute the tailings from the screen 21 fall onto the imperforate portion 45 in the upper end of the inclined box or shoe 46. This box or shoe is mounted on the lower ends 31 of the rockers which support the upper screening mechanism. Pairs of angular brackets 47 are secured to the sides of the box 46 and extend downwardly, their lower ends being pivotally connected at 48 to the rockers. In order to separate the large seed which still has lint adhering to it from the small seed and from the smooth seed, a series of spaced rods 49 are mounted in the bottom of the box 46 substantially on a level with the imperforate ends 45 and 50. These rods 49 extend transversely of the direction in which the seed flows down the box 46 and screen out the smaller seed and the smooth seed and any other foreign materials which might still be in the mixture. The clean large seed flow over the lower end 50 of the screen and may be collected in a receptacle 51 or some other suitable device.

The small seed and other material which pass through the spaces between the rods 49 is caught by the shoe 52 which is suspended from the rockers by means of angle plates 53 secured to its sides and pivoted at 54 on the lower ends of the rockers. The bottom 55 of the shoe 52 is imperforate and inclined so that as the machine operates the material falling onto it will pass down off the lower edge of it and into the receptacle 19. A chute 56 is connected at its upper end to the opening in the lower corner of the box 22 and discharges the dust and dirt collected in this box onto the lower end of the shoe 52. The trash, dirt and rejected seed may thus all be collected in the receptacle 19 or other suitable device at one end of the machine and the desired seed may be collected at the other end of the machine in a receptacle 51.

It will be seen that the screen 46 and shoe 52 are pivoted at points 48 and 54 respectively which lie on opposite sides of a line through the points 33 and 27 which constitute the pivotal support of the upper screening mechanism and the pivotal support of the rocker respectively. Consequently when the rocker is oscillated the shakers 46 and 52 will move back and forth and will also have a considerable up and down throw in opposite directions. This action facilitates the separation of the large seed from the small seed, and also rapidly moves the seed along the shakers.

The operation of the machine will be apparent from the foregoing description. Although the construction of the machine has been shown and described in detail, various modifications may be made therein without departing from the spirit of the invention.

Having thus described the invention what is claimed and desired to be secured by Letters Patent is:

1. In a cotton seed grader, the combination of a frame, rockers pivoted intermediate their ends on said frame, an upper screen supported by the rockers above their pivots and another screen pivoted on the rockers below the pivots of the latter and at a point on each rocker to one side of a line through the pivot of the rocker and the pivotal support of the upper screen.

2. In a cotton seed grader, the combination of a frame, rockers pivoted intermediate their ends on said frame, screening means supported by the rockers above their pivots, a lower screen, a shoe below said lower screen, brackets pivoted on said rockers at a point on each rocker to one side of a line through the pivot of the rocker and the pivotal support of the upper screen, said brackets carrying said lower screen and box and the position thereof causing said lower screen and box to have an up and down movement and also a back and forth movement, and means whereby said rockers are oscillated.

In testimony whereof I affix my signature.

HARRY MALSBERGER.

Copies of this patent may be obtained for five cents each, by addressing the "Commissioner of Patents, Washington, D. C."